Patented Jan. 4, 1938

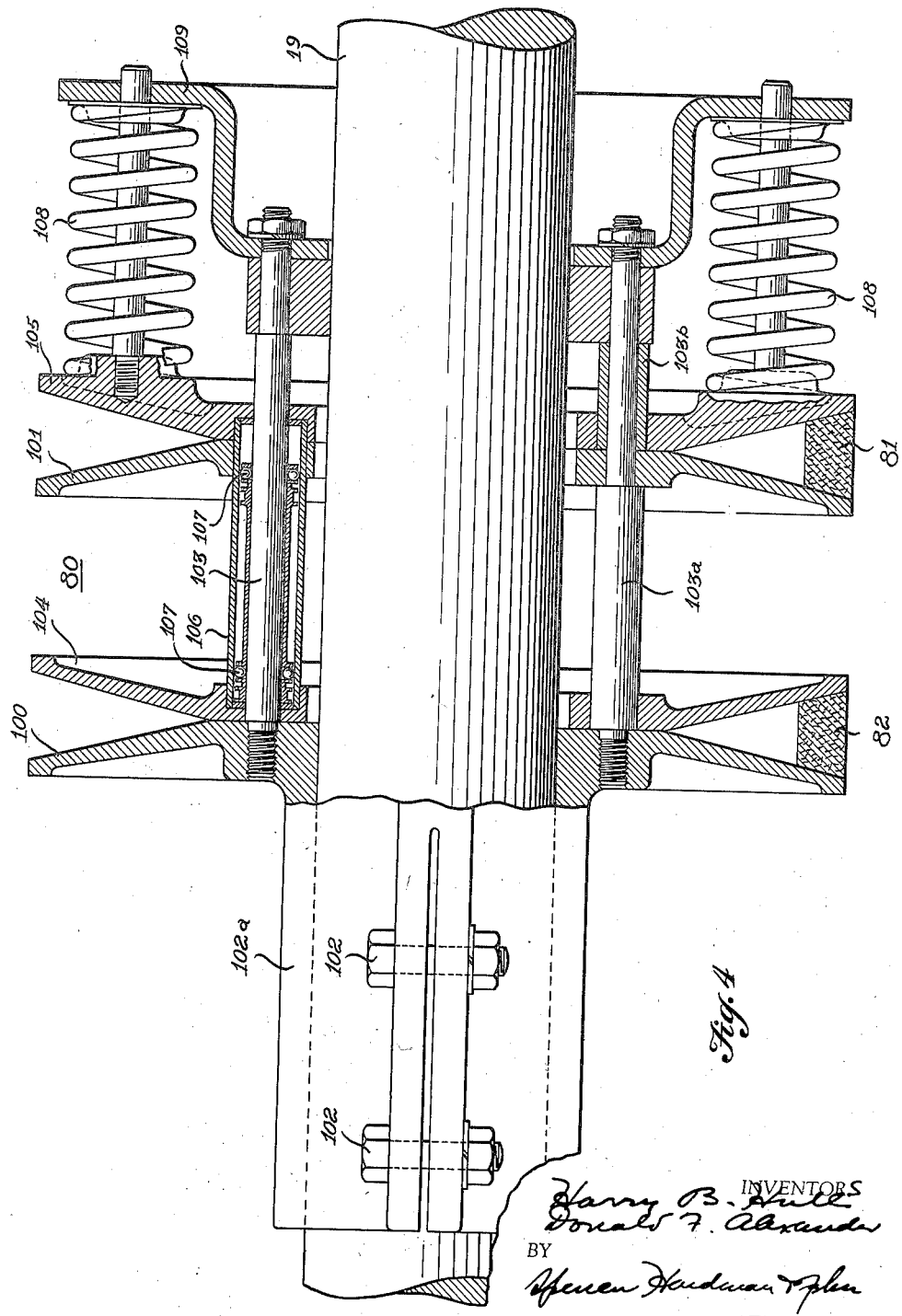

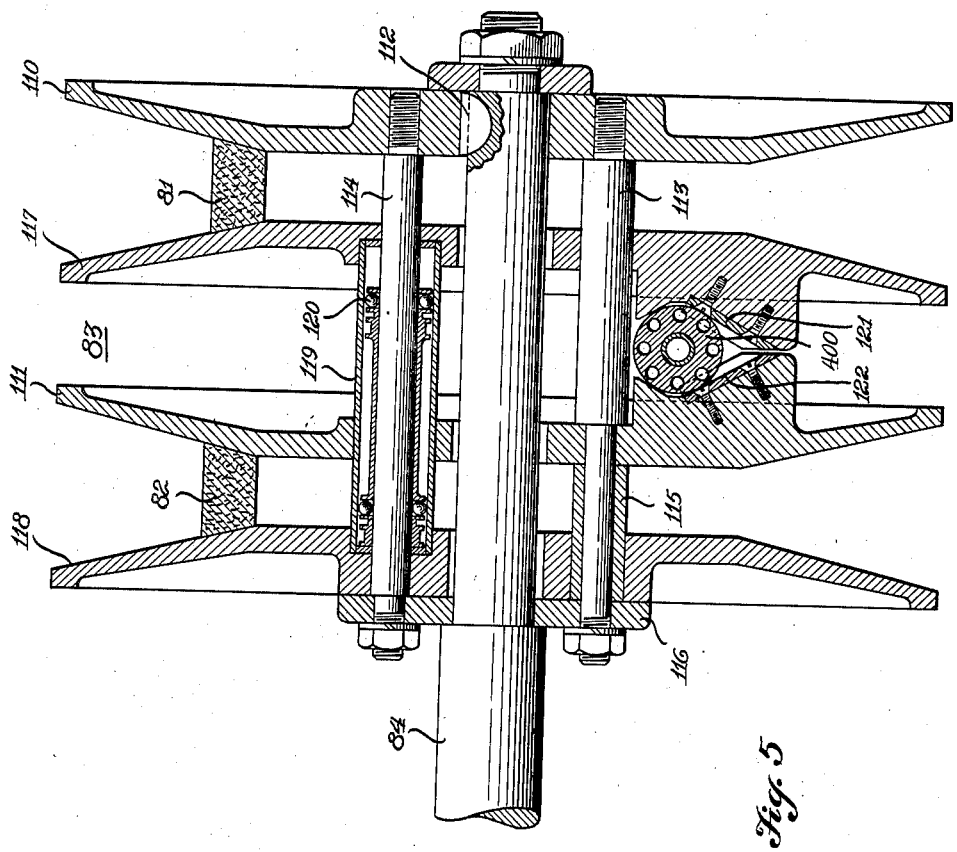

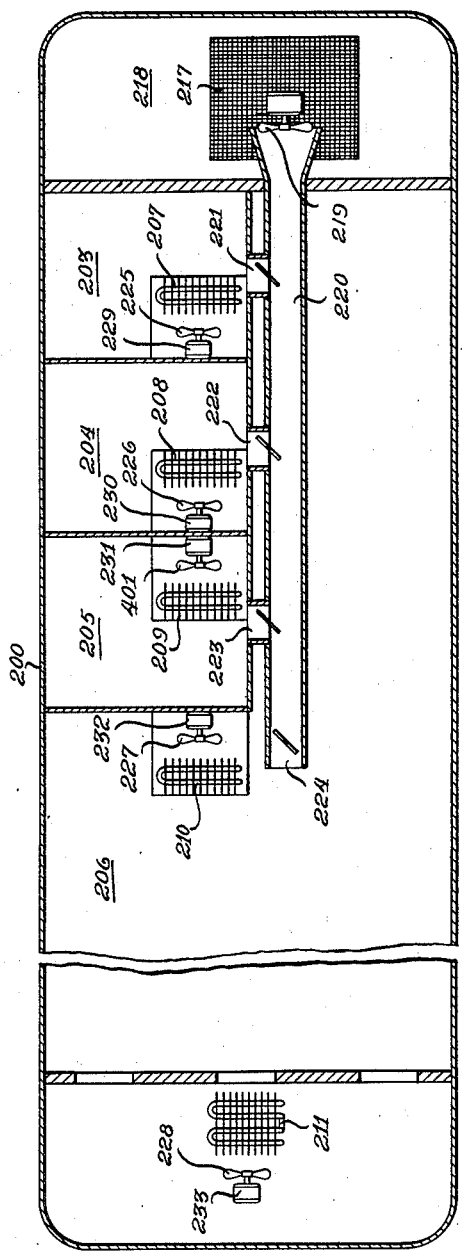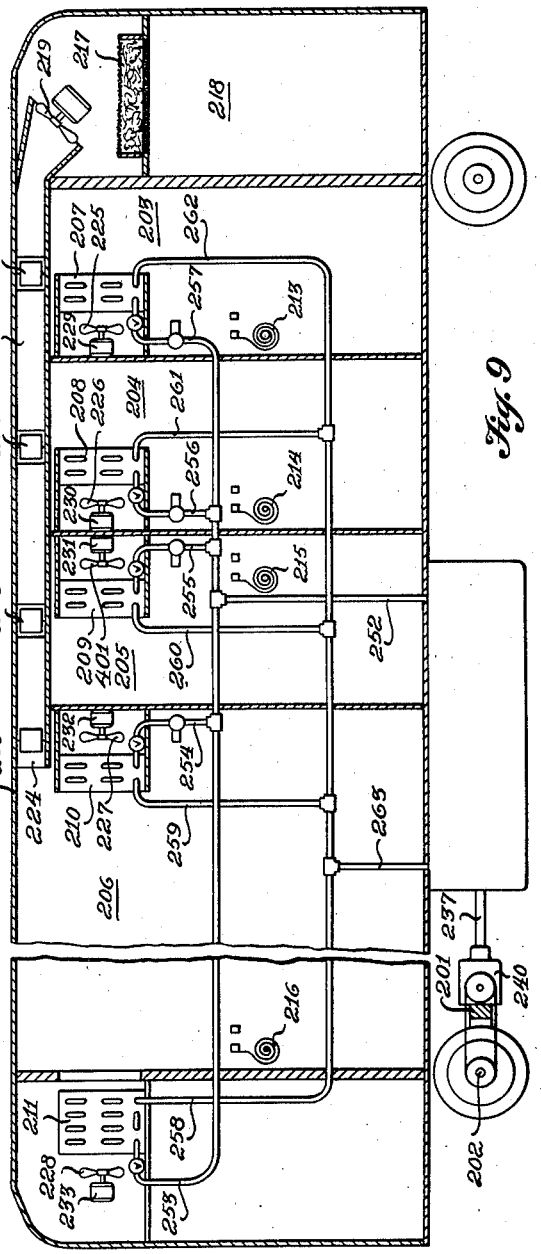

2,104,387

UNITED STATES PATENT OFFICE 2,104,387

REFRIGERATING APPARATUS

Harry B. Hull and Donald F. Alexander, Dayton, Ohio, assignors to General Motors Corporation, Dayton, Ohio, a corporation of Delaware Application January 31, 1935, Serial No. 4,345

11 Claims. (Cl. 62—117)

This invention relates to refrigeration.

It is an object of this invention to provide a refrigerating system on a vehicle which is fully automatic whether the car is running or standing still.

Further objects and advantages of the present invention will be apparent from the following description, reference being had to the accompanying drawings, wherein a preferred form of the present invention is clearly shown.

In the drawings:

Fig. 3 is an enlarged cross-sectional view of one of the overrunning clutches;

Fig. 4 is an enlarged cross-sectional view of the driving members of the variable speed drive;

Fig. 5 is a cross-sectional view of the driven members of the variable speed drive;

Figs. 8 and 9 are horizontal and vertical cross-sectional and diagrammatic views showing an application of the refrigerating system of Fig. 6 to a car.

Figure 1:
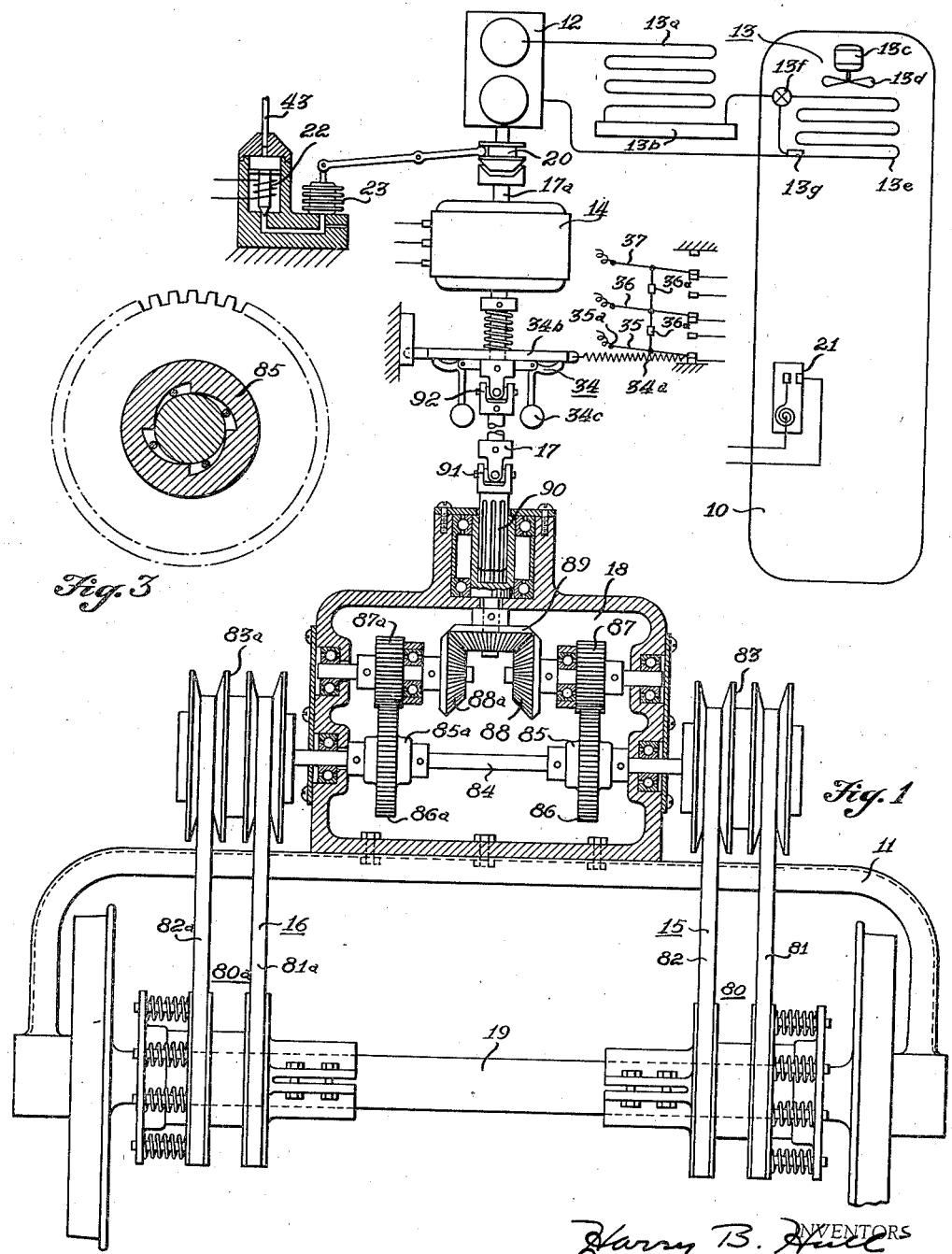
Fig. 1 is a view, partly diagrammatic and partly in cross-section, showing the main portions of one embodiment of this invention.

In practicing one feature of this invention, a vehicle has a main body 10 provided with a wheel truck 11 placed underneath the body 10 in such a manner that the truck may swing about a vertical axis to permit the vehicle to turn curves. A drive is provided between a wheel of the truck and the compressor 12 of a refrigerating system 13 carried on the main body 10. The arrangement is such that the truck can turn relatively to the body of the car and yet the driving connection is maintained.

In practicing another feature of the invention the compressor can be automatically started and stopped while it is being driven from a wheel of the vehicle and while the car is running above a predetermined speed. Also a motor-generator 14 is so connected that it generates electricity to charge a battery while the car runs above a predetermined speed and runs as a motor from said battery when the car is standing still or runs below a predetermined speed. Automatic controls are provided for controlling the operation of the compressor 12 when it is being driven by the motor-generator 14 or from the axle of the car. In one form of this invention a variable speed drive 15 or 16 drives the shaft 17 through the medium of a unidirectional and overrunning gear box 18. The arrangement is such that the shaft 17 is driven at a substantially constant speed from the axle 19 when the car runs above a predetermined speed, and is turned in the same direction whether the car runs forwardly or backwardly. When the car stops, or runs below a predetermined speed, the compressor may be turned by the motor-generator 14 acting as a motor. The compressor 12 is connected to be driven from the wheel and from the motor-generator 14 and is driven from the section 17a of the shaft 17 by means of a clutch 20 which is clutched and declutched in response to conditions created by the refrigerating system 13. For example temperature conditions created in the body 10 act on the thermostat 21 to energize and deenergize the solenoid 22 to control the brake or other air pressure on the bellows 23 which actuates the clutch 20. The arrangement is such that when the temperature in body 10 is above a predetermined limit the clutch 20 is placed in a driving position to operate the compressor, and when the temperature falls below a predetermined limit the clutch 20 is declutched and causes the compressor to stop.

Figure 2:
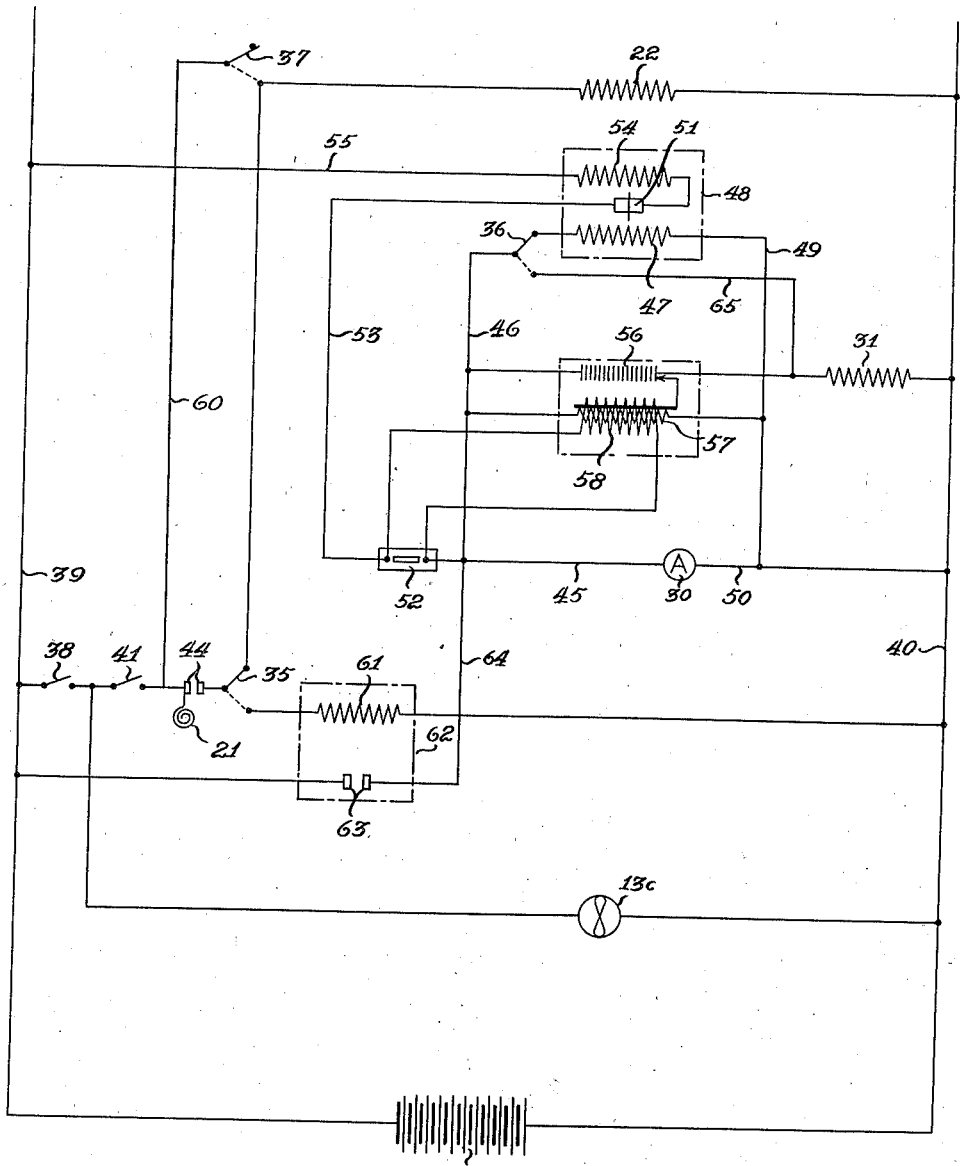
Fig. 2 is a wiring diagram for the system shown in Fig. 1.

The wiring for this arrangement is diagrammatically shown in Fig. 2 in which 30 indicates the armature of the motor-generator 14. The numeral 31 indicates the shunt field of the motor-generator 14. The battery 33 is connected to the motor-generator. The shaft 17 is provided with a speed responsive member 34 which actuates simultaneously the mutually insulated arms 35, 36 and 37 of suitable switches which are interposed in the electrical circuit. When the car runs above a predetermined limit, the arms 35, 36 and 37 snap to the upper position, and when the car stands still or runs below a predetermined speed limit, the arms snap to the lower position, by virtue of the movement of spring 34a passing the fulcrum 35a as the plate 34b is moved by the centrifugal weights 34c. The arms 35, 36 and 37 are designated with similar numbers in Figs. 1 and 2, and are connected by insulators 36a for simultaneous movement.

The variable ratio drive does not drive the longitudinal shaft at a substantially constant speed until the car reaches a predetermined speed. The centrifugal speed responsive member 34 is calibrated to snap from one position to the other while the car is travelling just below the predetermined speed at which the variable ratio drive becomes effective to deliver substantially constant speed to the longitudinal shaft 17.

Referring again to Fig. 2, when the car is running fast enough to charge the battery, the arms 35, 36 and 37 are in the upper positions. If refrigeration is desired, the hand switch 36 is closed which places the fan motor or motors 13c across the battery terminals 39 and 40. The hand switch 41 is also closed and this places the clutch solenoid 22 under the control of thermostat 21. The contacts 44 of the thermostat close when the car temperature rises to a predetermined limit and the clutch solenoid 22 is energized. This controls the brake air from pipe 43 to energize the bellows 23 and cause the clutch 20 to drive the compressor 12. When the contacts 44 open as the temperature of the car falls to a predetermined limit the solenoid 22 is de-energized and the clutch 20 opened. Thus the compressor starts and stops in response to car temperature.

At the same time the motor-generator 14 charges the battery 33. This is accomplished because current from armature 30 flows through lines 45 and 46, arm 36, solenoid 47 of reverse current relay 48, and lines 49 and 50 back to the armature 30. This closes contacts 51 and current from the armature 30 then flows through line 45 shunt plug 52, line 53, contacts 51, solenoid 54 and line 55 to line 39. Charging of the battery is then possible since the armature 30 is placed across the battery lines 39 and 40. At the same time the field winding 31 is placed in series with the automatic variable resistance 56 under the control of voltage control solenoid 57 placed across the armature 30 and the current control solenoid 58 placed across the shunt plug 52. If for any reason the current between the battery and generator should reverse, the solenoids 47 and 54 buck each other and open the contacts 51 in the well-known manner.

When the car slows down or stops the arms 35, 36 and 37 assume the lower or dotted line positions. The motor 14 then drives the compressor 12 under control of thermostat 21. This is accomplished because the clutch solenoid 22 is energized through line 60 and arm 37 thus clutching the motor 14 to the compressor 12. The thermostat 21 starts and stops the motor 14 by causing current to flow in response to temperature conditions through solenoid 61 of starter 62. This controls contacts 63 so that when they close at the upper temperature limit current flows from line 39 through contacts and lines 64 and 45 to armature 30. At the same time variable resistance 56 is shorted out of the field coil 31 by the lowering of arm 36 so that the field coil 31 is placed across the armature by the aid of arm 36 and line 65. At the same time the reverse current relay 48 is taken out of the circuit by the lowering of arm 36.

The refrigerating system 13 may include compressor 12, condenser 13a, receiver 13b and evaporator 13e in refrigerant flow relationship. Air is blown over the evaporator by a fan 13d driven by a motor 13c, the air coming from the space to be conditioned, from the outside or both. The air is blown into the space to be conditioned and in which thermostat 21 is located. The expansion valve 13f is set to maintain automatically a temperature above 32° F. and below the temperature of conditioned air. The thermostatic bulb 13g, on the outlet of the evaporator, throttles the valves 13f and prevents "frost back" between the evaporator and compressor. The motor 13c is controlled by hand switch 38.

The variable ratio drive may be of any suitable construction. Thus two driving pulley structures 80 and 80a are placed on shaft 19. These driving pulley structures may be substantially identical and are merely placed in diametric relationship with each other. These structures are connected by belts 81, 82, 81a and 82a with the driven pulley structures 83 and 83a respectively. The driven pulley structures 83 and 83a are fixed on the shaft 84 which carries the overrunning clutches 85 and 85a and which are provided with gears 86 and 86a which mesh with gears 87 and 87a connected to bevel gears 88 and 88a meshing with the beveled gear 89 and which drives the shaft 17 through the medium of the sliding keyway 90 and the universal joint 91. The shaft 17 is provided with another universal joint 92 which connects with the section 17a which may be carried by bearings on the main body 10 of the car. The construction is such that the truck 11 may turn relatively to the main body 10 and this change in position is compensated for by the sliding keyway 90 and the universal joints 91 and 92. The overrunning clutches 85 and 85a are so arranged that the shaft 17 is driven in a selected direction by one of the variable ratio drives, such as 15, when the car goes forward and the shaft 17 is still driven in the same direction when the car travels backwardly by the variable ratio drive 16. It is to be seen that the overrunning clutches 85 and 85a, which are shown in cross-section in Fig. 3, are arranged so that the shaft 17 is always turned in the same direction regardless of the direction of rotation of the shaft 84. This permits the motor-generator 14 to turn in the same direction either as a generator or as a motor, and its rotation is not reversed when it is changed from a generator to a motor or vice versa.

The variable ratio drives 15 and 16 may be identical, except that they are diametrically placed with respect to each other. The driving pulley structure 80 is shown more in detail in Fig. 4. It may include a pair of flanges 100, 101 which are both rotationally and axially on the shaft 19. The flange 100 is fixed on the shaft 19 by the bolts 102 and by proper keys between the cylinder 102a and the shaft 19. The flange 101 is fixed to the shaft 19 through the medium of rods 103 and 103a which in turn are secured to the flange 100. There are several rods 103 and 103a arranged about the shaft 19. The rods 103a have sleeves 103b which lock the flange 101 axially. A pair of flanges 104 and 105 are so arranged that they move axially with respect to axle 19 and cause the belts 81 and 82 to move radially towards the shaft 19 as the speed of the axle 19 increases, and this movement is so calibrated that the shaft 84 is driven at a substantially constant speed while the car travels between certain speeds as will be hereinafter more fully described. Simultaneous movement of the flanges 104 and 105 may be accomplished by providing a plurality of sleeves 106, which are fixed to the flanges 104 and 105, and which ride on the rods 103 through the bearings 107. The flanges 104 and 105 may thus move axially with respect to the axle 19 by riding on the rods 103. A spring tension may be imposed on the flanges 104 and 105, and this may be accomplished by a plurality of springs 108 which bear against the flange 105 at one end of and against a flange 109 at the other end. The flange 109 may be placed in fixed relationship, both with respect to rotation and axial movement, on the shaft 19. This may be accomplished by mounting the flange 109 also on the rods 103 and 103a which in turn are fixed on the flange 100 which in turn is fixed on the shaft 19. The strength of the springs 108 is so chosen that the flanges 104 and 105 move axially the proper amount to maintain the shaft 84 substantially at a constant speed, as hereinafter more fully described.

The driven pulley structure 83 is shown more in detail in Fig. 5. This structure may include a pair of flanges 110 and 111 which are fixed, both rotationally and axially, with relation to the shaft 84. This may be accomplished by fixedly keying the flange 110 on the shaft 84 at 112. The flange 111 is fixedly connected to the flange 110 through the medium of rods 113 and 114, there being several of the rods 113 and 114. The rods 113 are provided with sleeves 115 which, together with the washer 116, fixedly clamp the flange 111 with respect to the flange 110. A pair of relatively movable flanges 117 and 118 are provided. These flanges are keyed to each other by the sleeves 119 which ride on ball bearings 120 on the rods 114. The spacing between the flanges 117 and 118 is thus maintained constant; but the flanges 117 and 118 may move simultaneously axially with respect to the flanges 110 and 111.

The movement of the flanges 117 and 118 is governed by any suitable means which tends to maintain the shaft 84 at a substantially constant speed. Thus a plurality of centrifugal weights 400 may bear against the surfaces 121 and 122 and tend to spread them apart upon slight differential increase of speed. The spreading apart of these surfaces moves the flange 117 towards the flange 110 and the flange 118 towards the flange 111. Such a motion causes the belts 81 and 82 to move radially downward. Such belt motion is compensated for by a simultaneous movement of the belts radially inward on the driving pulley structure 80. Thus if the speed of the shaft 84 tends to increase, the belts 81 and 82 move downwardly on the driven pulley structure 83 and thus tend to increase the effective belt diameter on this structure. At the same time the belts move radially inward on the driving structure 80 and thus tend to decrease the driving diameter on this structure. The calibration of the centrifugal weights 80 and the strength of the springs 108 can be such that the speed of the shaft 84 can be maintained substantially constant within any desired constant speed limits, there being merely the slightest speed differential on the shaft 84, sufficient to permit the radial movement of the weights 400. Any suitable structure for the weights 400 may be used, but we prefer to use the weight structure disclosed in the copending application of Charles L. Paulus and Lester E. Perrine, Serial No. 742,490, filed September 1, 1934.

As will be readily understood, when the car is standing, the motor-generator 14, as a motor, drives the compressor 12, starting and stopping in response to refrigeration conditions by the control of thermostat 21. As the gear box 18 constitutes an overrunning clutch, the shaft 17a can turn independently of the car axle 19. This action continues even while the car is running slowly; but when a predetermined car speed is reached, the motor-generator is transformed to a generator and the compressor 12 is driven by power derived from the wheel of the car. This transformation from motor to generator is accomplished when the speed of axle 84 almost reaches the constant speed zone, at which time it turns faster than the overrunning clutch and turns the motor-generator fast enough to cause the switches 35, 36 and 37 to be thrown in the upper positions. When this occurs, the battery is charged by the generator and the compressor is started and stopped by the action of the clutch 20 under the control of thermostat 21 in response to refrigeration conditions.

While a variable ratio drive between shafts 19 and 84 has been disclosed and is preferred, it is to be understood that many advantages of the invention may be used even when the variable ratio drive is omitted, as by making the flanges 110, 111, 117 and 118 all axially fixed so that the belts 81 and 82 cannot travel radially in and out of the driven pulleys. The axially movable flanges 104 and 105 may be retained as belt tension take-up devices. Also any other type of unvariable or variable ratio drive may be substituted for the one specifically disclosed.

Figure 6:
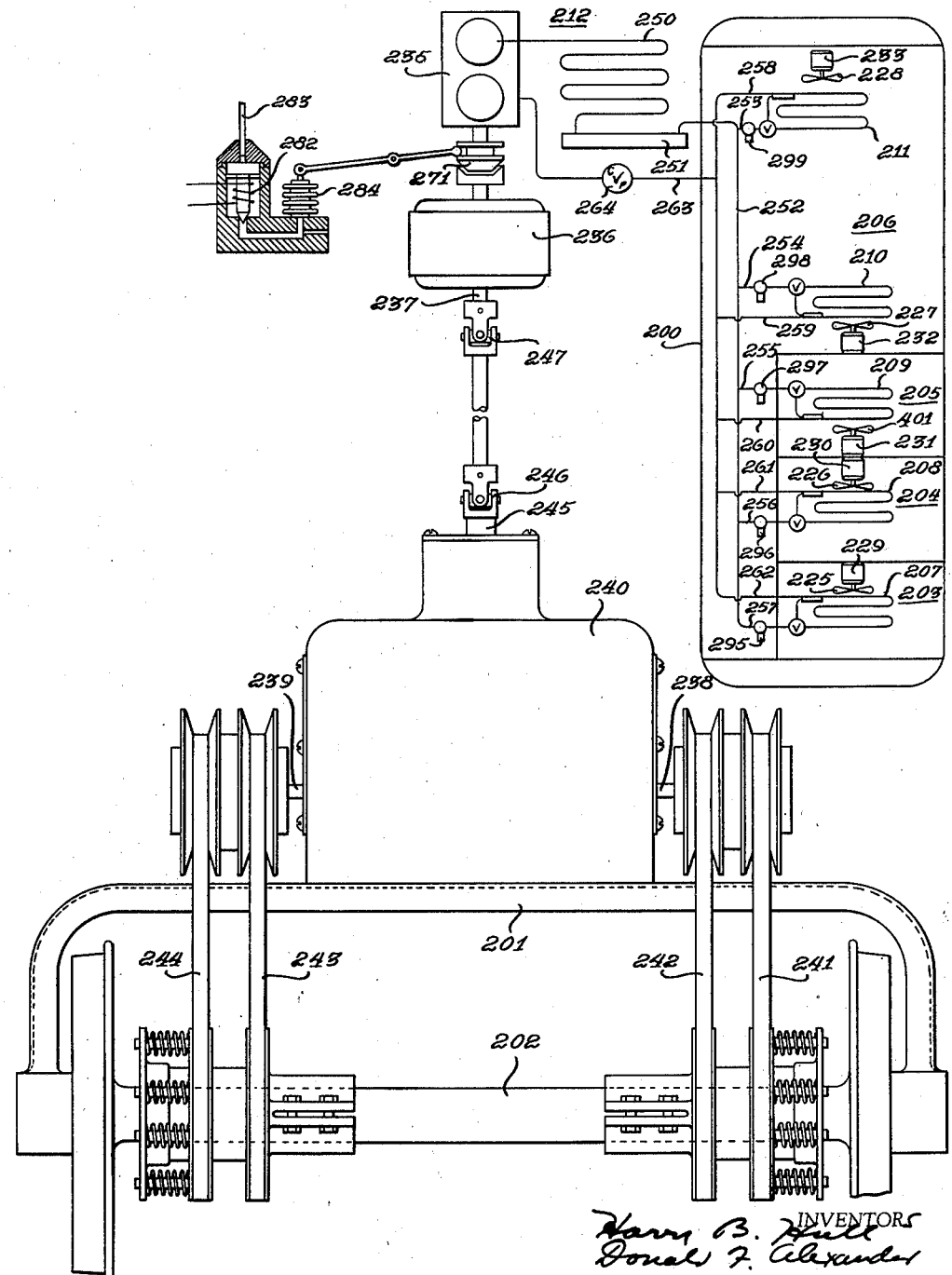
Fig. 6 is a view, somewhat similar to Fig. 1, but showing a modified form.
Figure 7:
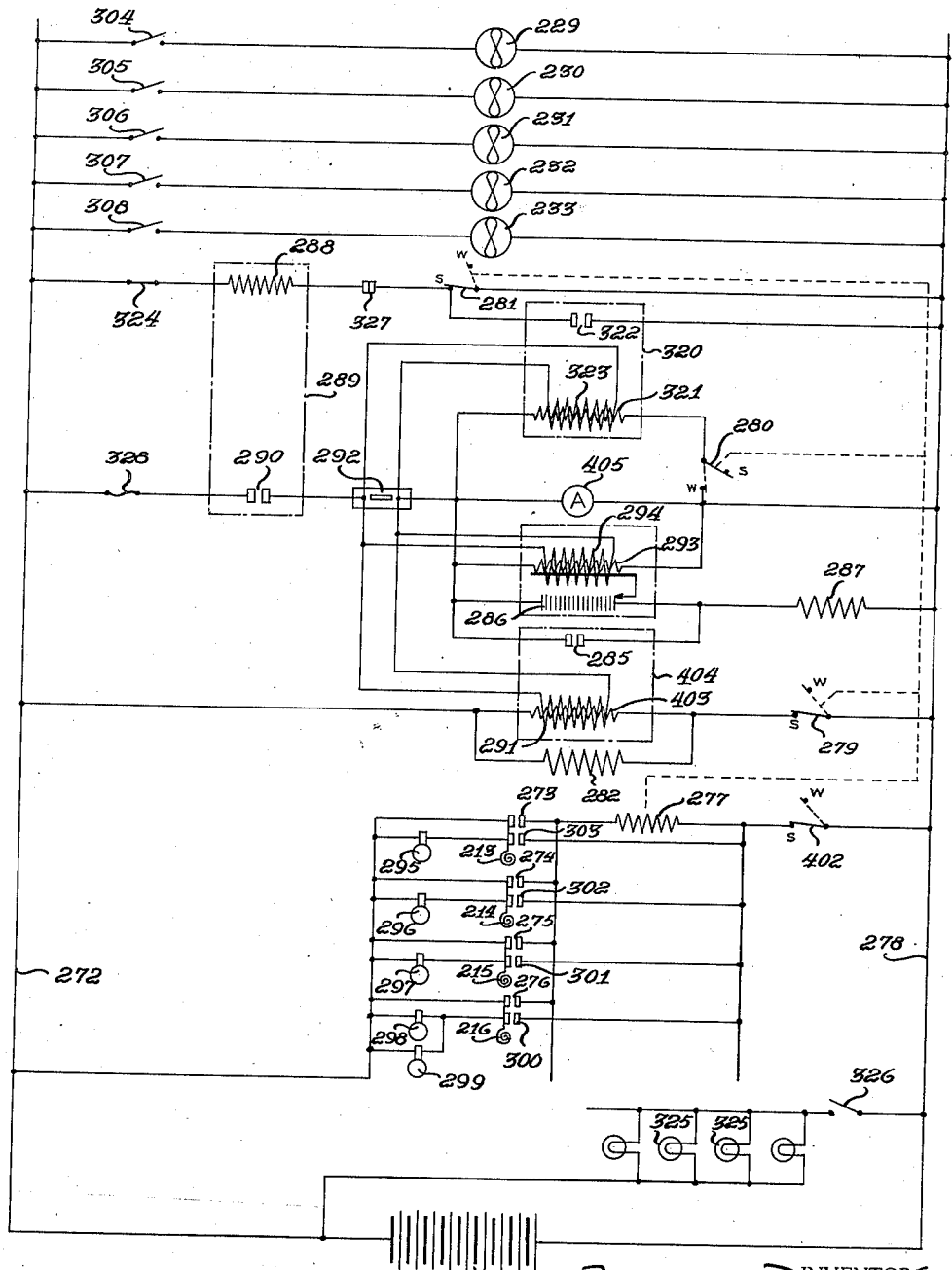
Fig. 7 is a wiring diagram of the modification shown in Fig. 6.

In the modification shown in Figs. 6 to 8 inclusive, the car may include a main body 200, a wheel truck 201 having wheel axle 202. The main body 200 may be provided with one or more compartments for which air is to be conditioned. For the purpose of illustration compartments 203, 204, 205 and 206 have been shown. The refrigerating system for conditioning the air is indicated as comprising a plurality of evaporators 207, 208, 209, 210 and 211 connected in refrigerant flow relationship with a refrigerant liquefying unit 212 in a manner to be more fully described. A plurality of thermostats 213, 214, 215 and 216 may be placed in one or more compartments 203 to 206 and arrangements are made whereby these thermostats control refrigeration in the various compartments, and if desired, causes the refrigerant liquefying unit 212 to cease operation if all of the compartments are below their respective predetermined low temperature limits.

The circulation of air in the various compartments may be of any suitable character, but in the preferred embodiment, a filter 217 is placed to permit fresh air from the vestibule 218 to be circulated by motor-driven fan 219 through a conduit 220. This conduit is provided with branches 221, 222, 223 and 224 for introducing fresh air into any or all of the compartments as indicated. Each of the evaporators 207 to 211 inclusive may be provided with fans 225, 226, 401, 227 and 228 driven by motors 229, 230, 231, 232 and 233 respectively. The air circulated by the fans 225 to 228 inclusive may come from the compartment for which the air is being conditioned and is merely recirculated over the respective evaporators and is discharged in the form of a gentle blast in the upper part of the respective compartments. In the case of compartment 206, there are two evaporators 210 and 211 provided as indicated.

The refrigerant liquefying unit 212 is so connected with the axle 202, that its compressor 235 may be driven directly from the axle 202 when the speed of the vehicle is above a predetermined limit and may be driven by a motor-generator 236, acting as a motor, when the speed of the vehicle is below a predetermined speed. The axle 202 may be connected with the shaft 237 of the motor-generator 236 in any suitable manner. As indicated, the shaft 202 drives the shafts 238 and 239 of the gear box 240 through the medium of belts 241, 242, 243 and 244. The gear box 240 and belt drive may be substantially the same as those heretofore disclosed with respect to Figs. 1 to 5 inclusive. It is to be understood, however, that it is not necessary to drive the shaft 237 at a constant speed and that the belt drive indicated need not have any radius adjustment whatsoever, the flanges of the driven pulleys being fixed axially so that the effective radius of the drives does not change as heretofore described with respect to Figs. 1 to 5 inclusive. If a variable ratio drive is used, the axle 202 drives the shaft 237 at an increasing speed until the vehicle reaches a predetermined speed such as, say, 25 M. P. H. Upon further increases in speed of the vehicle, the shaft 237 is driven at a substantially constant speed there being but the slightest differential in speed increase. If desired, also the adjustment of the variable ratio may be such that the speed of shaft 237 varies, but not at the same increment as shaft 202. The gear box 240 may be connected by sliding keyway 245 and the universal joints 246 and 247 substantially the same as in Fig. 1. The motor-generator 236 and the compressor 235 may be carried by the main body of the car 200.

The refrigerating system is so arranged that the compressor 235 may be driven at a varying speed and yet the evaporators 207 to 211 inclusive have their refrigerant pressure maintained at an effective temperature to cool the compartments. The arrangement is also such that if any one or more of the evaporators is rendered inactive, the refrigerant pressure in the remaining active evaporators is not materially changed and they are permitted to continue to function substantially as before. This may be accomplished as follows: The compressor 235 delivers compressed refrigerant to the condenser 250 which in turn delivers condensed refrigerant to the receiver 251. Liquid refrigerant flows through the line 252 to the branches 253, 254, 255, 256 and 257 which delivers refrigerant to the evaporators 207 to 211 inclusive. The evaporated refrigerant from the evaporators returns through the branches 258, 259, 260, 261 and 262 to the main evaporated refrigerant line 263 which delivers refrigerant to the compressor 235. This main line 263 is provided with an automatic valve 264 which automatically throttles the line 263 sufficiently to maintain the suction pressure in the branches 258 to 262 inclusive substantially constant. Under such circumstances, the compressor 235 is made of sufficient volumetric capacity so that when it operates at its slowest normal speed it has sufficient capacity to properly refrigerate all of the evaporators. If the speed of the compressor is then increased beyond this normal lowest speed, the valve 264 begins its throttling function and maintains the suction pressure on the evaporators substantially constant. Also if one or more of the evaporators is rendered inactive, as by its thermostatic control, the valve 264 maintains the pressure in the remaining active evaporators substantially constant. If all of the evaporators are rendered inactive, the compressor 235 may be permitted to continue to idle without the loss of any substantial amount of power, or if all of the automatic features are used, the compressor may be automatically stopped when all of the evaporators are rendered inactive.

The electrical arrangement of the automatic controls is indicated on the wiring diagram of Fig. 7. The motor-generator 236 is so connected with a battery 270 that the motor-generator reverses current from the battery when the car axle 202 is running too slowly to operate the motor-generator 236 as a generator. However, when the axle 202 does have sufficient speed, the wiring arrangements are automatically changed to cause the motor-generator 236 to charge the battery 270. When the motor-generator 236 acts as a motor, the compressor 235 is automatically clutched thereto by clutch 271. When the motor-generator 236 is running as a generator, the clutch 271 is automatically closed also and may remain closed all the time that refrigeration is required, but arrangements are shown whereby the compressor may be declutched when all of the thermostats 213 to 216 inclusive have opened. It is to be understood that the compressor 235 may be driven all the time, however, and that if all of the evaporators are rendered inactive, only a relatively small amount of power is necessary to run the compressor.

In the wiring diagram of Fig. 7 the arrangement is such that a manual switch 402 may be operated so that in its lower position the wiring circuits are placed in "summer" position and when the switch is placed in the upper position the wiring circuits are placed in "winter" position. By "summer" position is meant that the compressor 235 is placed in driving relationship with the motor-generator 236. The motor-generator 236 may act as a motor if the car is not travelling at a sufficient speed, or it may act as a generator if the car has sufficient speed. Whenever the wiring diagrams are in "summer" position the compressor 235 is operating and circulates refrigerant under the flow control of thermostats as hereinafter more fully explained. By "winter" position is meant that the compressor 235 is disconnected from the motor-generator 236 and that the motor-generator 236 is free to charge the battery 270 if the motor-generator has sufficient speed and that a reverse current from the battery to the motor-generator is prevented if the motor-generator does not have sufficient speed to charge the battery. The "winter" position may be assumed by the circuits even in the summer when refrigeration is not required. This non-requirement may occur either because the entire refrigerating system is manually rendered inoperative or because all of the thermostats 213 to 216 inclusive have opened in response to temperature conditions indicating that all of the compartments are cold enough so that they do not require refrigeration.

The "summer" circuits of Fig. 7 are as follows: When the switch 402 is manually placed in "summer" position, and one or more of the thermostats 213 to 216 inclusive have closed their contacts, current flows from the battery line 272 through one or more of the thermostat contacts 273, 274, 275 or 276 and through a solenoid 277 and switch 402 to the battery line 278. When coil 277 is thus energized it actuates the switch arms 279, 280 and 281 to the "summer" or s position. When this happens the closing of switch 279 places the clutch solenoid 282 across the battery terminals 272 to 278. The energization of the solenoid 282 controls the flow of brake air in pipe 283 to the bellows 284 so as to close the clutch 271 and cause the compressor 235 to be clutched to the motor-generator 236.

If the car is stationary or running at slow speed the motor-generator 236 acts as a motor and drives the compressor. This occurs because the battery voltage placed across solenoid 403 of polarized reverse current relay 404 closes contacts 285 and thus shorts the variable resistance 286 and places the field coil 287 across the armature. At the same time current across solenoid 288 of starter 289 closes contacts 290 and places the armature 405 across the battery. Under such conditions the battery continues to drive the motor and compressor until the car picks up generating speed or until all of the thermostats open. If the car runs fast enough to charge the battery, the coil 291 bucks coil 403 due to the reversal of current across the shunt plug 292. This opens contacts 285 and places the variable resistance 286 in series with the field coil 287 across the armature. The variable resistance 286 is under control of voltage compensating solenoid 293 placed across the armature and current compensating coil 294 placed across the shunt plug 292.

The evaporators of the refrigerating system are under the control of the thermostats under "summer" conditions. Solenoid valves 295 to 299 inclusive are placed in the liquid refrigerant branches as shown and are placed in series relationship with contacts 300 to 303 respectively of the thermostats. Thus when thermostat 213 is warmed and closes, for example, solenoid valve 295 opens and permits the flow of refrigerant to evaporator 207, causing it to cool compartment 203. When this compartment is cooled sufficiently, the thermostat 213 opens and this closes valve 295 thus stopping flow of refrigerant to evaporator 207. The same control is imposed on the other compartments and evaporators. Referigeration is thus supplied to the various compartments by thermostatic control of the flow of refrigerant to their respective evaporators. When all of the thermostats open, the compressor may be automatically stopped by the deenergization of solenoid 277 which opens the switch 279 which deenergizes clutch coil 282; but it is to be understood that the automatic control of the starting and stopping of compressor 235 may be dispensed with and the compressor may be allowed to run all the time, for example by changing the control of clutch 271 from a thermostatic to a manual control. This may be accomplished by placing the coil 282 across the battery terminals with a manual switch control in lieu of thermostatic control, merely by making switch 279 manually controlled instead of being responsive to the conditions of the thermostats and solenoid 277.

The fan motors 229 to 233 may be made individually controllable by placing them across the battery in series with individual manual switches 304 to 308 respectively. If refrigeration is not desired in any one of the compartments either the thermostat of that room may be adjusted to remain open at all normal temperatures (a well-known adjustment of many thermostats) or else the respective fan motor may be stopped.

During winter time, or when refrigeration is not required, the hand switch 402 may be placed in the upper or $w$ position, or all of the thermostats open because of the reduced temperature. This denergizes coil 277 which in turn places the switches 279, 280 and 281 in their "winter" or $w$ position. This operation declutches the compressor 235 from the motor-generator 236 by deenergizing coil 282. At the same time it changes the controls so that the motor-generator 236 can charge the battery 270 if the car has sufficient speed and so that the motor-generator cannot "motor" if the car does not have sufficient speed. This is accomplished because the coil 403 is placed out of the circuit by the opening of switch 279 and coil 291 is not strong enough to close contacts 285. Thus the adjustable resistance 286 is placed in series with field coil 287 for all "winter" conditions and maintains the motor-generator field in "generating" condition. The polarized reverse current relay 320 is placed in the circuit by the closing of switch 280 which places solenoid 321 across the armature. Whenever the voltage across the armature exceeds the battery voltage the correct amount, the solenoid 321 closes the contacts 322. This is accomplished by calibrating the solenoid 321 to the correct voltage value. As the contacts 322 are now in control of starter 289 by virtue of the opening of switch 281, when the contacts 322 close they energize solenoid 288 and close contacts 290 which permits charging of the battery under control of variable resistance 286. If the speed of the generator falls to the point where the current reverses then the reverse flow through coil 323 bucks coil 321 and the contacts 322 open which in turn causes contacts 290 to open. Thus the motor-generator charges the battery when it has sufficient generating capacity and is disconnected therefrom when it does not have such capacity.

The hand switch 324 is intended to remain normally closed and is opened only if it is desired to disconnect the generator from the battery manually. The lights 325 and any other appliances may be placed across the battery under control of their respective switches such as 326. Any safety controls desired may be imposed on contacts 327 which are caused to open under actuation of any such control. The usual fuse protection may be placed at 328. The contacts 322 and 285 may be provided with proper delay devices, such as dashpots or the like.

While the form of embodiment of the invention as herein disclosed, constitutes a preferred form, it is to be understood that other forms might be adopted, all coming within the scope of the claims which follow.

What is claimed is as follows:

1. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; and mechanical means automatically maintaining the same direction of current generated by said motor-generator when the vehicle travels in either direction.

2. In a vehicle, a live axle assembly; a compressor; a unitary motor-generator; a battery; torque transmitting means from said live axle assembly to said compressor and motor-generator and between said compressor and motor-generator; and control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery, said torque transmitting means comprising an overrunning unidirectional connection.

3. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; and mechanical means automatically maintaining the same direction of current generated by said motor-generator when the vehicle travels in either direction, said torque transmitting means comprising an overrunning unidirectional connection.

4. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; and mechanical means automatically maintaining the same direction of current generated by said motor-generator when the vehicle travels in either direction, said mechanical means comprising a unidirectional drive.

5. In a vehicle, a live axle assembly; a compressor; a unitary motor-generator; a battery; torque transmitting means from said live axle assembly to said compressor and motor-generator and between said compressor and motor-generator; and control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery, said torque transmitting means comprising a universal joint and a splined shaft extending longitudinally of the vehicle.

6. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; and mechanical means automatically maintaining the same direction of current generated by said motor-generator when the vehicle travels in either direction, said torque transmitting means comprising a universal joint and a shaft extending longitudinally of the vehicle.

7. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; mechanical means automatically maintaining the same direction of current generated by said motor-generator when the vehicle travels in either direction; and a clutch between said live axle assembly and said compressor.

8. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; mechanical means automatically maintaining the same direction of current generated by said motor-generator when the vehicle travels in either direction; and means responsive to refrigeration conditions controlling the operation of said compressor.

9. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; and centrifugal switch means for controlling the operation of said compressor.

10. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; and centrifugal switch means for controlling the motoring and/or generating characteristics of the motor-generator.

11. In a vehicle, a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery; and centrifugal switch means for controlling the operation of said compressor and the motoring and/or generating characteristics of the motor-generator.

HARRY B. HULL.
DONALD F. ALEXANDER.